US006633943B1

United States Patent
James et al.

(10) Patent No.: US 6,633,943 B1
(45) Date of Patent: Oct. 14, 2003

(54) METHOD AND SYSTEM FOR THE SIMPLIFICATION OF LEAF-LIMITED BRIDGES

(75) Inventors: David Vernon James, Palo Alto, CA (US); Jose Diaz, San Jose, CA (US); Hisato Shima, Toyko (JP); Glen David Stone, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 355 days.

(21) Appl. No.: 09/665,388

(22) Filed: Sep. 20, 2000

Related U.S. Application Data

(60) Provisional application No. 60/155,305, filed on Sep. 21, 1999, provisional application No. 60/158,722, filed on Oct. 11, 1999, and provisional application No. 60/167,958, filed on Nov. 29, 1999.

(51) Int. Cl.[7] ................................................ G06F 13/42
(52) U.S. Cl. ........................ 710/306; 710/104; 370/258; 709/220; 709/249
(58) Field of Search ................................ 710/305–317, 710/104; 709/220, 249; 370/258

(56) References Cited

U.S. PATENT DOCUMENTS

| | | | |
|---|---|---|---|
| 5,684,959 A | 11/1997 | Bhat et al. | |
| 5,717,853 A | 2/1998 | Deshpande et al. | |
| 6,032,261 A | 2/2000 | Hulyalkar | |
| 6,038,625 A | 3/2000 | Ogino et al. | |
| 6,128,318 A | 10/2000 | Sato | |
| 6,131,119 A | 10/2000 | Fukui | |
| 6,160,796 A | 12/2000 | Zou | |
| 6,286,067 B1 * | 9/2001 | James et al. | 710/104 |
| 6,374,316 B1 * | 4/2002 | James et al. | 710/104 |
| 6,502,158 B1 * | 12/2002 | James et al. | 710/311 |
| 6,539,450 B1 * | 3/2003 | James et al. | 710/306 |
| 2002/0065942 A1 * | 5/2002 | Niwa et al. | 709/249 |

OTHER PUBLICATIONS

International search report, PCT/US00/40973, Jan. 16, 2001, 1 pg.

* cited by examiner

Primary Examiner—Rupal Dharia
(74) Attorney, Agent, or Firm—Blakely, Sokoloff, Taylor & Zafman LLP

(57) ABSTRACT

A method of address management in a net having a plurality of buses linked by a plurality of bus bridges where the net has only one branch bus with multiple bus bridges. A local identification address is assigned to each node on a branch bus and a bus number is assigned to each bus other than the branch bus. The bus number includes a common base and the local identification address for the node having a portal that connects to that bus.

11 Claims, 13 Drawing Sheets

METHOD AND SYSTEM FOR THE SIMPLIFICATION OF LEAF-LIMITED BRIDGES

CROSS-REFERENCE TO RELATED APPLICATIONS

This application claims benefit of U.S. Provisional Application No. 60/155,305 filed Sep. 21, 1999 as well as U.S. Provisional Application No. 60/158,722 filed Oct. 11, 1999 and U.S. Provisional Application No. 60/167,958 filed Nov. 29, 1999.

FIELD OF THE INVENTION

The present invention relates generally to audio, video, audio/video interconnected systems for home and office use. More particularly, the present invention relates to address routing protocols in leaf-limited bus bridges of such systems.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge" and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 1394–1995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a non-cyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without demonstrating performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult. Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

SUMMARY OF THE INVENTION

A method of address management in a net having a plurality of buses linked by a plurality of bus bridges where the net has only one branch bus with multiple bus bridges is described.

A local identification address is assigned to each node on a branch bus and a bus number is assigned to each bus other than the branch bus. The bus number includes a common base and the local identification address for the node having a portal that connects to that bus.

BRIEF DESCRIPTION OF THE DRAWINGS

Features and advantages of the prevention invention will be apparent to one skilled in the art in light of the following detailed description in which.

DETAILED DESCRIPTION

A method and system for simplifying address assignment and routing in leaf-limited bus bridges are described. Address assignment and routing in bus bridges may be simplified if one of the portals is known to be a leaf-bus portal, as discussed below.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
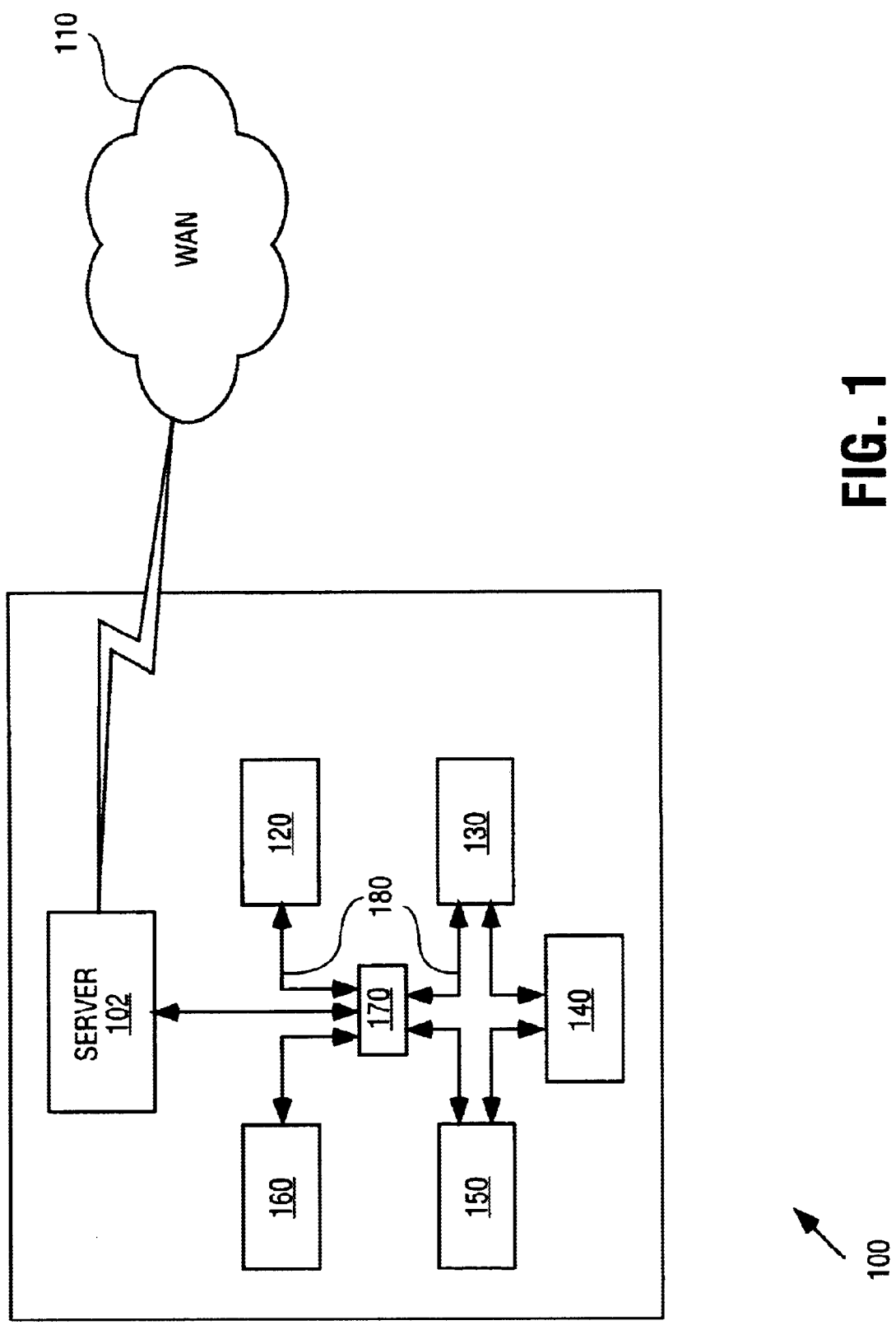
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
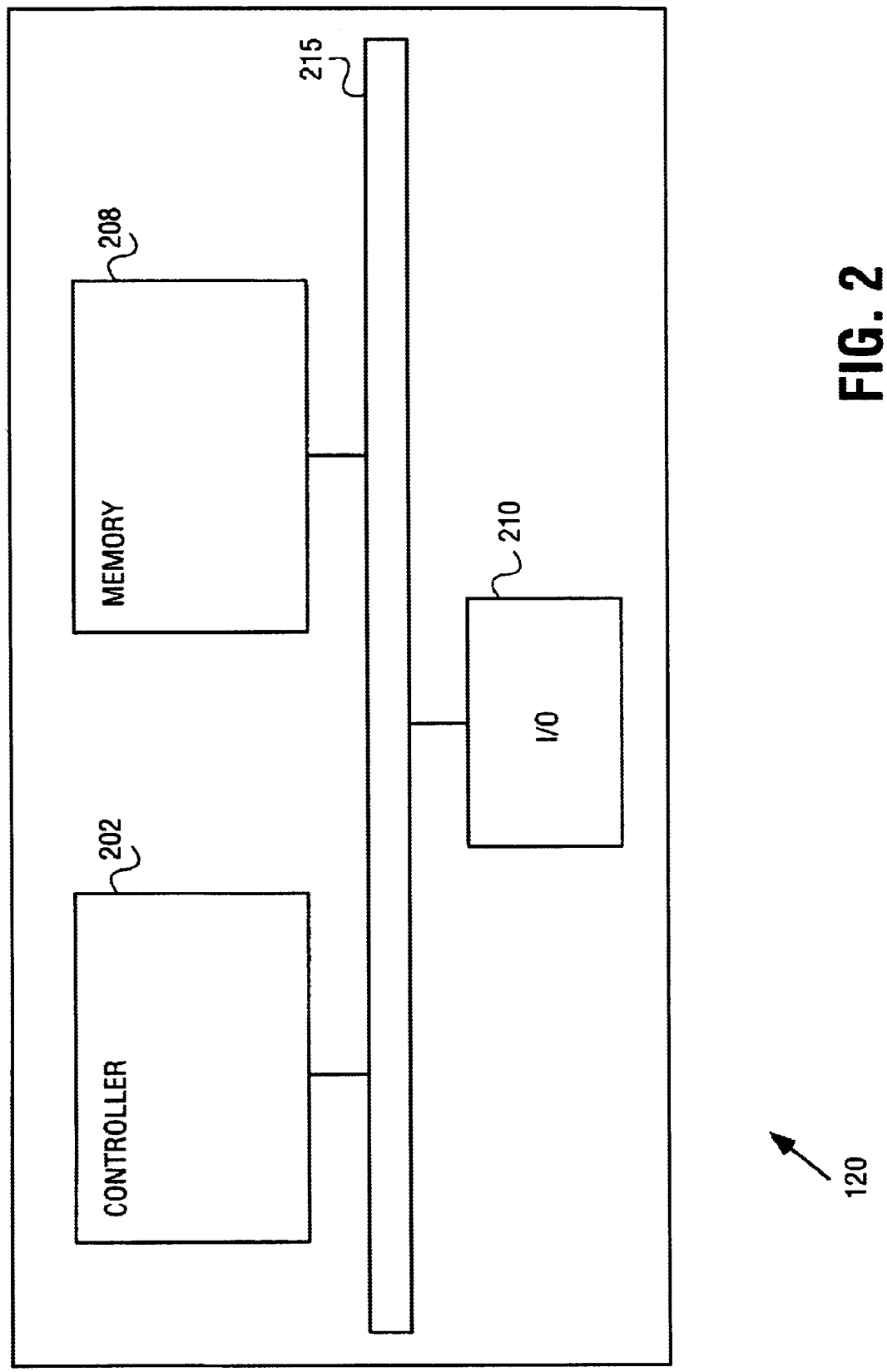
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
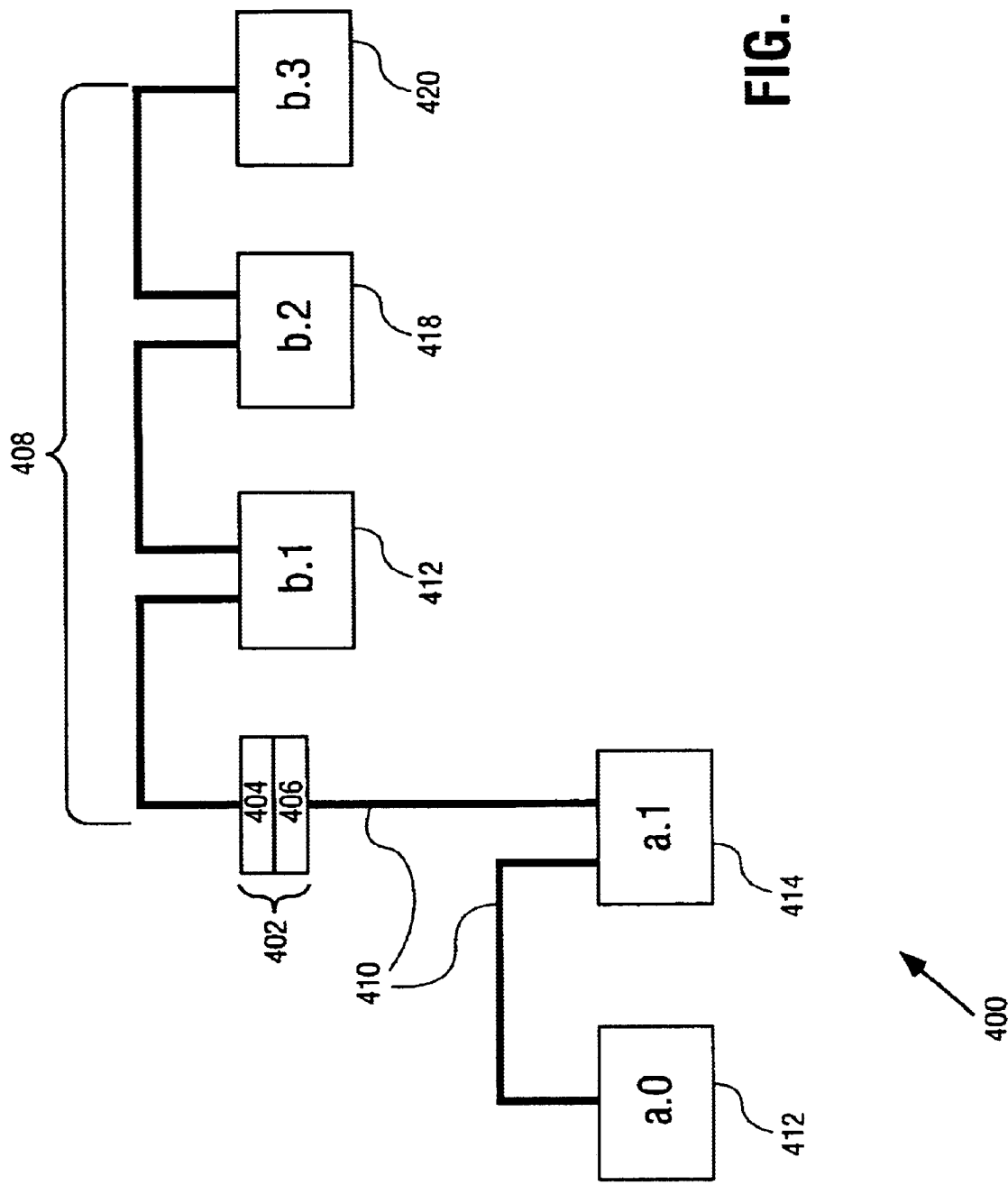
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systems—Control and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
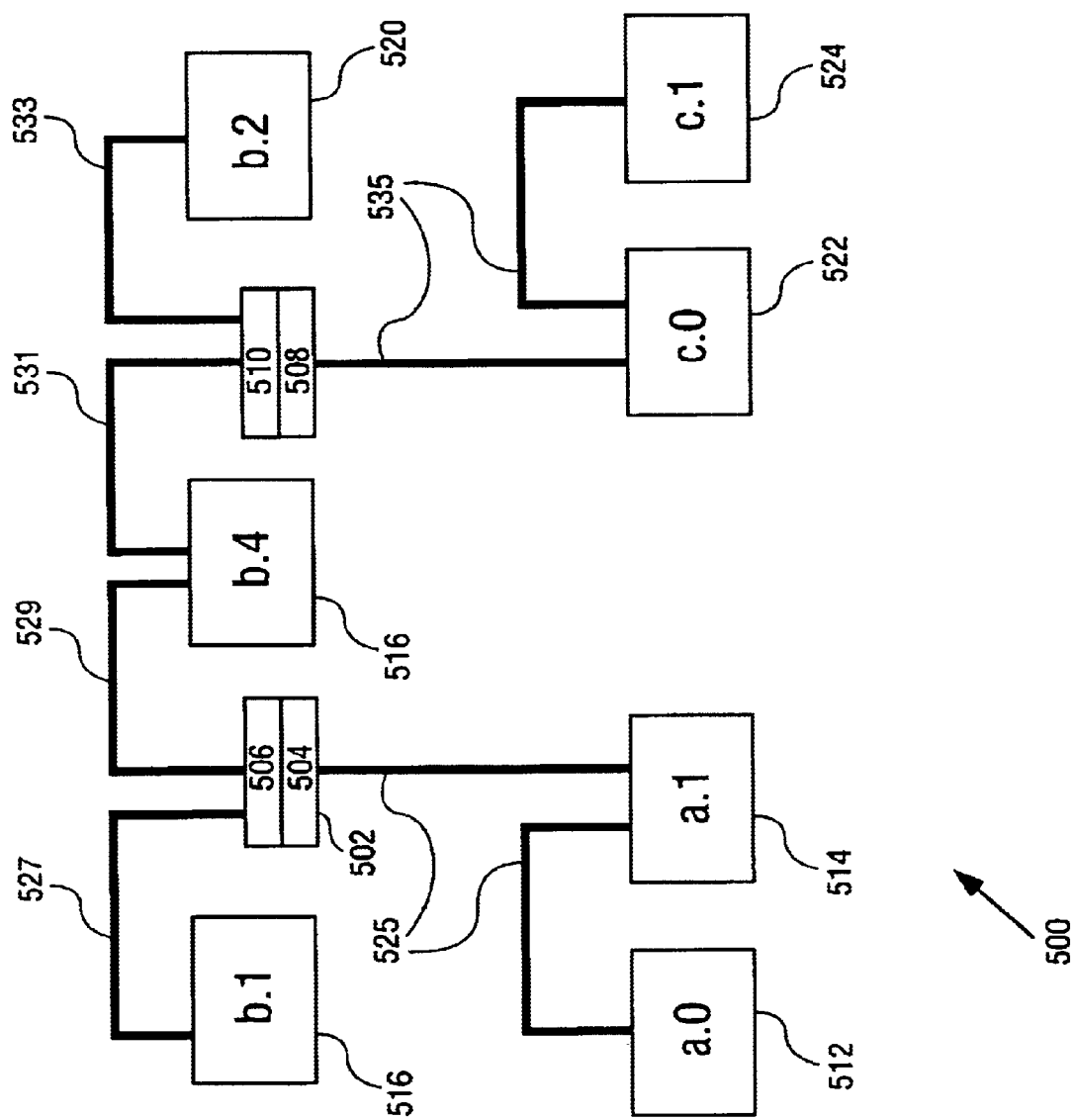
FIG. 4 is a block diagram of one embodiment for a 1394 bus bridge topology.
Figure 5:
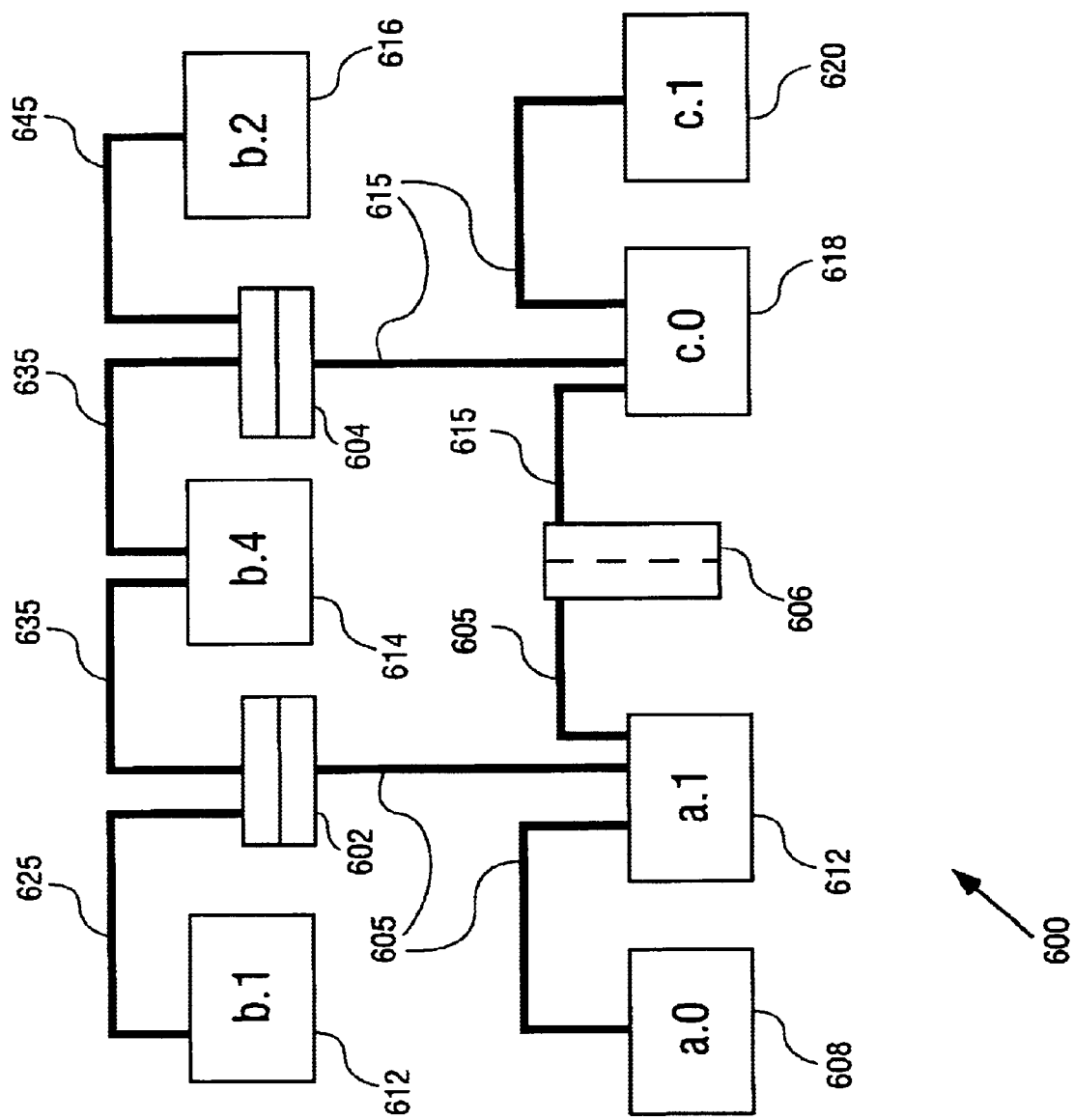
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506, 508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506, 508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

In one embodiment, alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
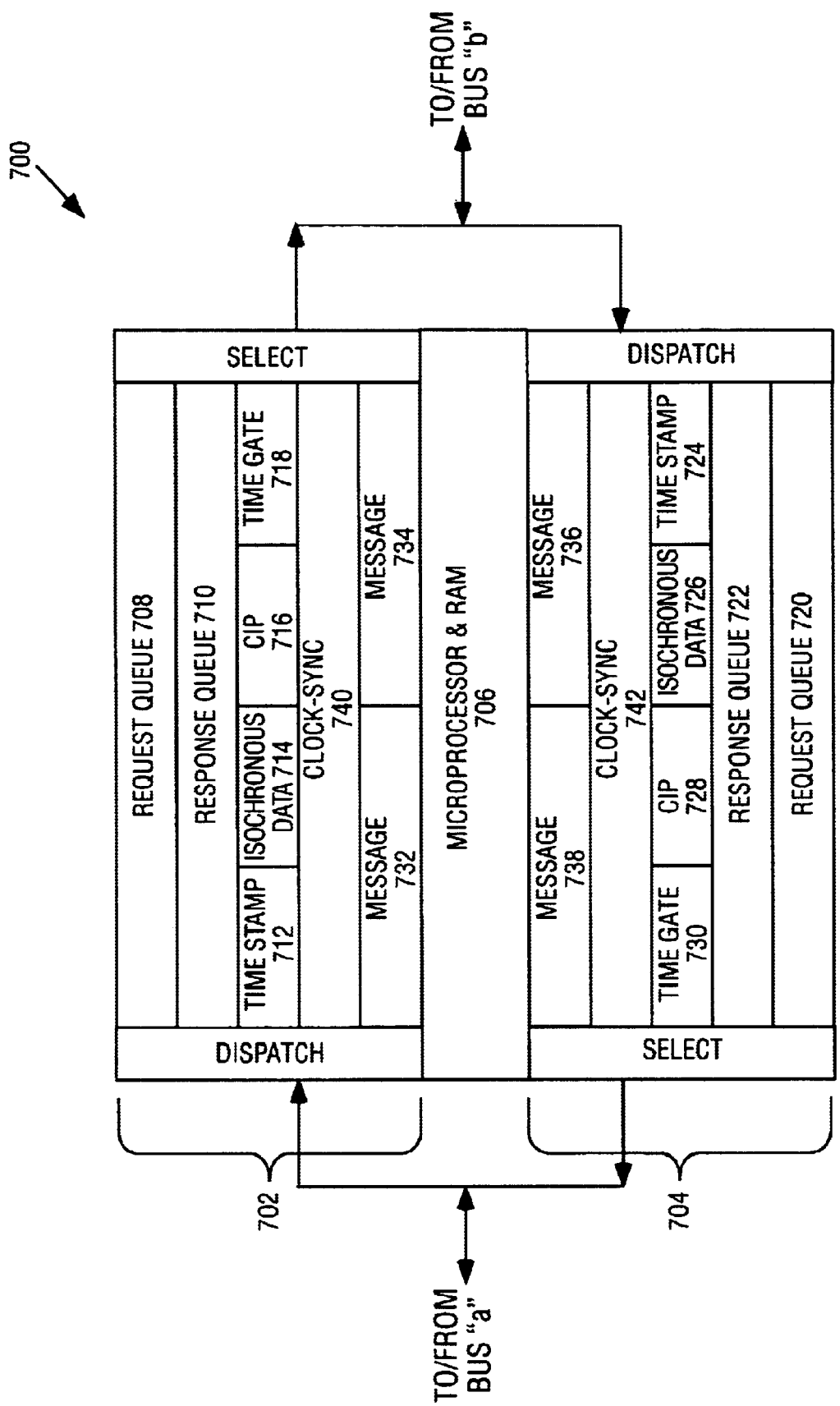
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request subction based on the local identification of a bus-local requester. A set of legacy its identifies local nodes which requires specific processing of sourced requests and returning responses.

Figure 7:
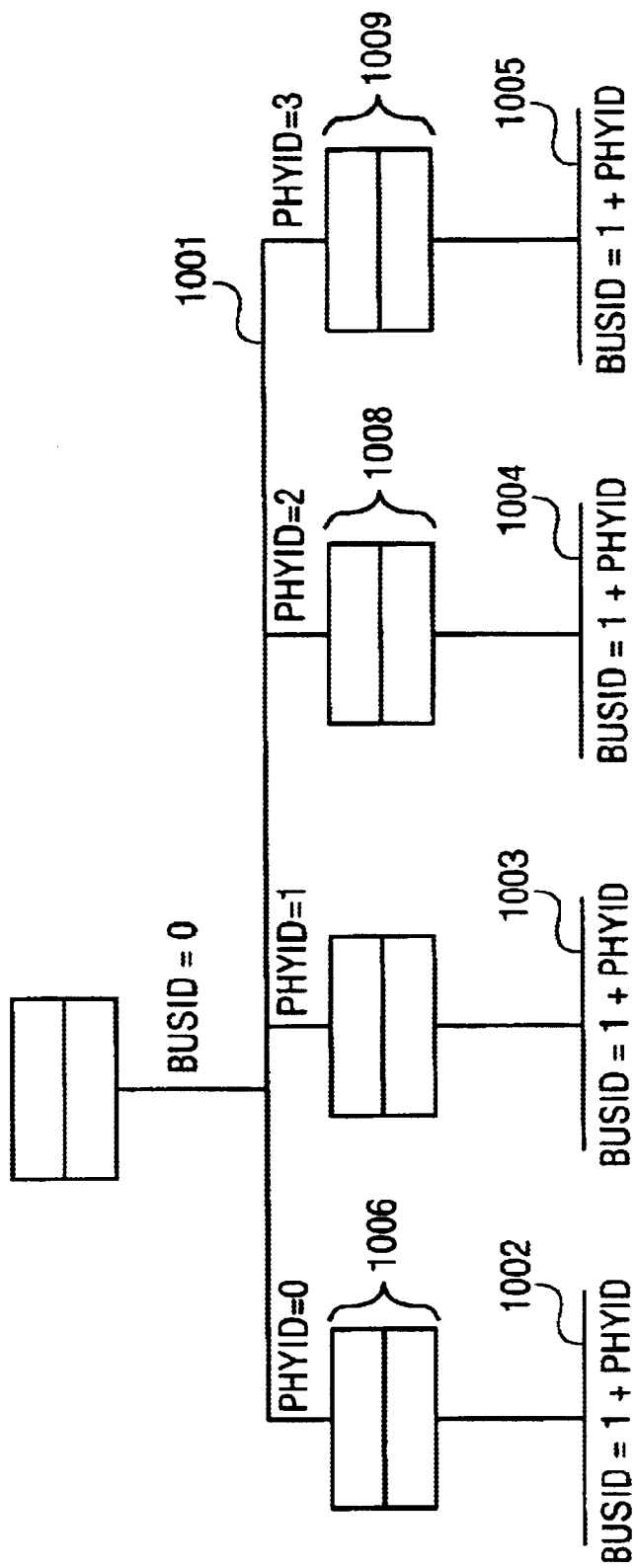
FIG. 7 is a block diagram of one embodiment for a bus bridge topology having leaf-limited bridges.

FIG. 7 is a block diagram of one embodiment for a bus bridge topology having leaf-limited bridges. In one embodiment, the serial bus uses a 64-bit addressing architecture. The most-significant 16 bits (nodeID) of the 64 bits specifies a target-node (as discussed above). The least significant 48 bits (offset address) specifies a location within that node (i.e. selects what resource to access within a node). The nodeID has two components: a) the first 10 bits, or busID, is used to identify the bus, and b) the remaining 6 bits (localID) is used to identify the device on the bus. The localID may be a phyID, which is a physically related ID. Whenever a node is attached or detached, all the other nodes may change. In one embodiment, there are 64 node addresses on each bus and 1024 buses in a system. Thus, address spaces are a linear way of corresponding to these addresses in a bus bridge, as illustrated in FIG. 7.

Bus bridges may be simplified if one of the portals is known to be a leaf-bus portal. With reference to FIG. 5, a leaf bus 525, 535 is a bus that has only one attached portal 504, 508. Bus bridges 502 having one portal that is a leaf-bus portal are called leaf-limited bridges. A leaf-limited bridge 502 has two portals, called type-A 504, 508 and type-B portals 506, 510, where type-A portals 504, 508 are intended to be attached to a leaf bus 525, 535. Other non-leaf-limited bridges have two type-C portals, as discussed below. An expected application for a leaf-limited bridge is to connect multiple cable-based serial bus interconnects to a common serial bus like backbone interconnect.

Address routing protocols may be simplified in topologies that include leaf-limited bridges. By restricting the applicability of the bridge to have one side be the only portal on its bus, the portal does not have to deal with forwarding of multiple bus addresses. However, one portal of the bus may be required to be the prime portal. The address routing protocols of the prime portal are more complex because it must also recognize addresses that are not valid.

The design of the prime portal may be simplified by restricting busID assignments to be a function of the phyID. In one embodiment, busID assignments may be restricted to the form "base+phyID," in which base may be a multiple of 64:

$$\text{base} = n \times 64 \quad \{\text{equation 1}\}$$

and phyID may be the node's 6-bit phyID assignment.

Referring again to FIG. 7, the base is shown to be 0. Thus, in the embodiment shown, n in equation 1 equals 0. In the bus system shown, a central bus 1001 has a busID of 63, and leaf-limited bus bridges 1006–1009 are connected to the central bus 1001. Thus, the central bus is assigned a busID set by the equation:

$$\text{central busID} = \text{base} + 63 = (n \times 64) + 63 \quad \{\text{equation 2}\}$$

Leaf buses 1002–1005 are connected to bus bridges 1006–1009, respectively. Bus bridge 1006 has a phyID of 0, bus bridge 1007 has a phyID of 1, bus bridge 1008 has a phyID of 2 and bus bridge 1009 has a phyID of 3. Since the base is 0, buses 1002–1005 are assigned busIDs equal to their phyIDs, or 0–3, respectively.

The prime portal need not assign a value of 0+phyID as the bus number, since this derived value is assumed in the design and phyID assignments are basic capabilities of all nodes. But, if there is a more capable (i.e. higher ranking) bus bridge, each leaf-bus limited portal will accede to what the more capable bus bridge requires.

Figure 8:
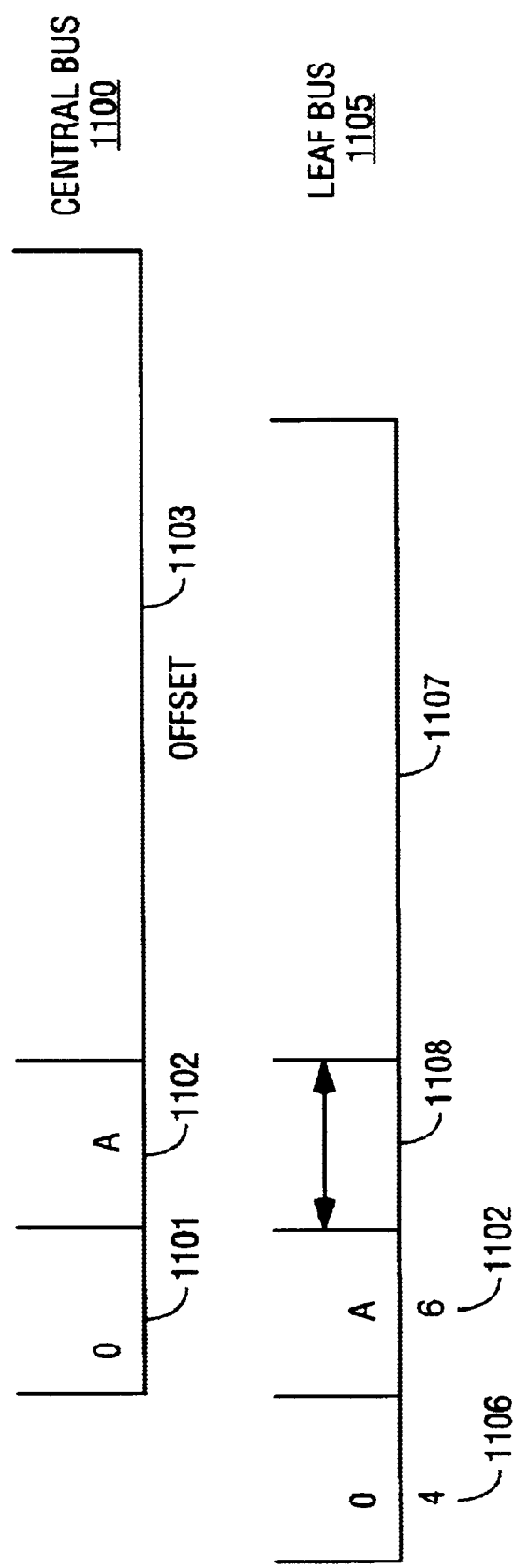
FIG. 8 is a block diagram of one embodiment of destination address structures for a system having leaf buses.

FIG. 8 is a block diagram of one embodiment of destination address structures for a system having leaf buses. In FIG. 8, a bus bridge on node n on the central bus 1100 has a destination_id of 0.n plus the offset 1103, where the busID 1101 is 0 and the localID 1102 is n. Thus, the busID for a node on the leaf bus 1105 attached to node n would be a 4-bit base 1106 plus the 6-bit phyID 1102 of the bus bridge to which the leaf bus is attached, which is in this case A. The destination_id for a node on the leaf bus would also include the localID of the node 1108 and the offset 1109.

Figure 9:
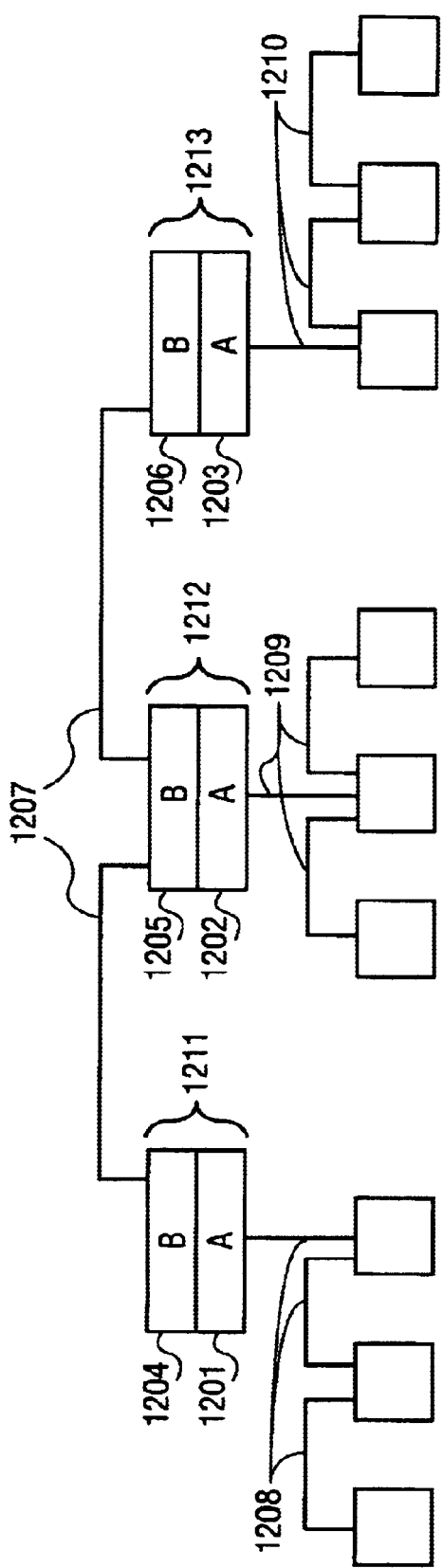
FIG. 9 is a block diagram of one embodiment of a bus system having a homogeneous topology.
Figure 12:
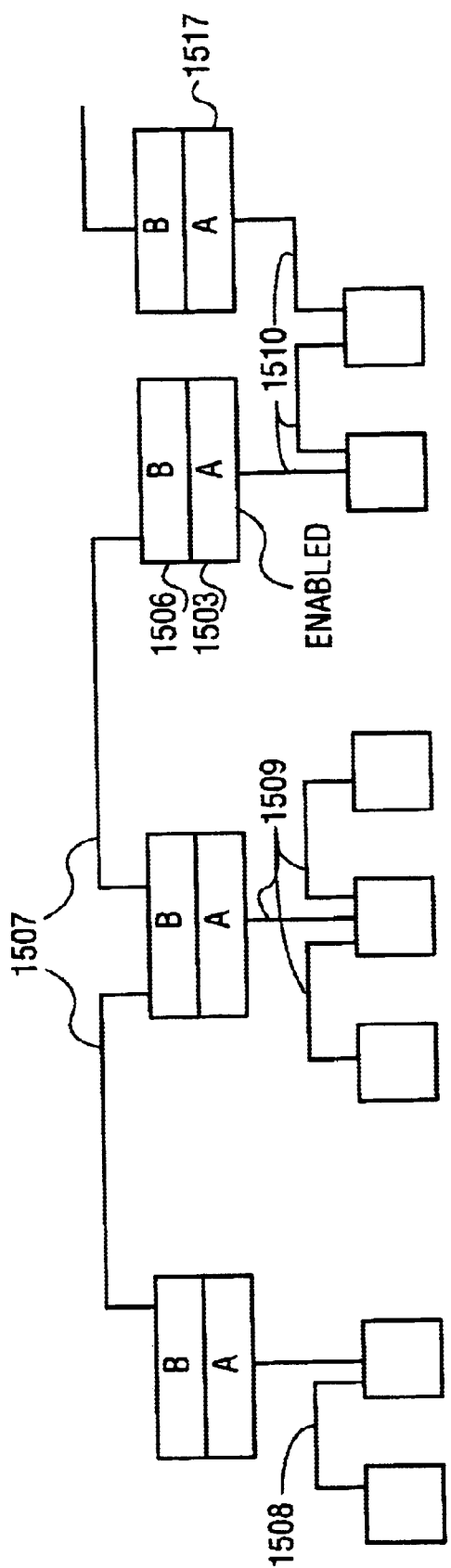
FIG. 12 is a block diagram of one embodiment of a bus system having two bus bridge portals on a leaf bus.

An example of the simplified address-routing may be observed with respect to FIG. 9. A homogeneous leaf-bus topology, as shown in FIG. 12, has one branch bus and multiple leaf buses. Branch bus 1207 includes leaf-limited bridges 1211–1213 having type-A portals 1201–1203 and type-B portals 1204–1206 where type-B portal 1206 is the prime portal. Type-A portals 1201–1203 are connected to leaf buses 1208–1210, respectively. In homogenous topologies, routing decisions may be simplified as described below.

Figures 10A, 10B, 10C:
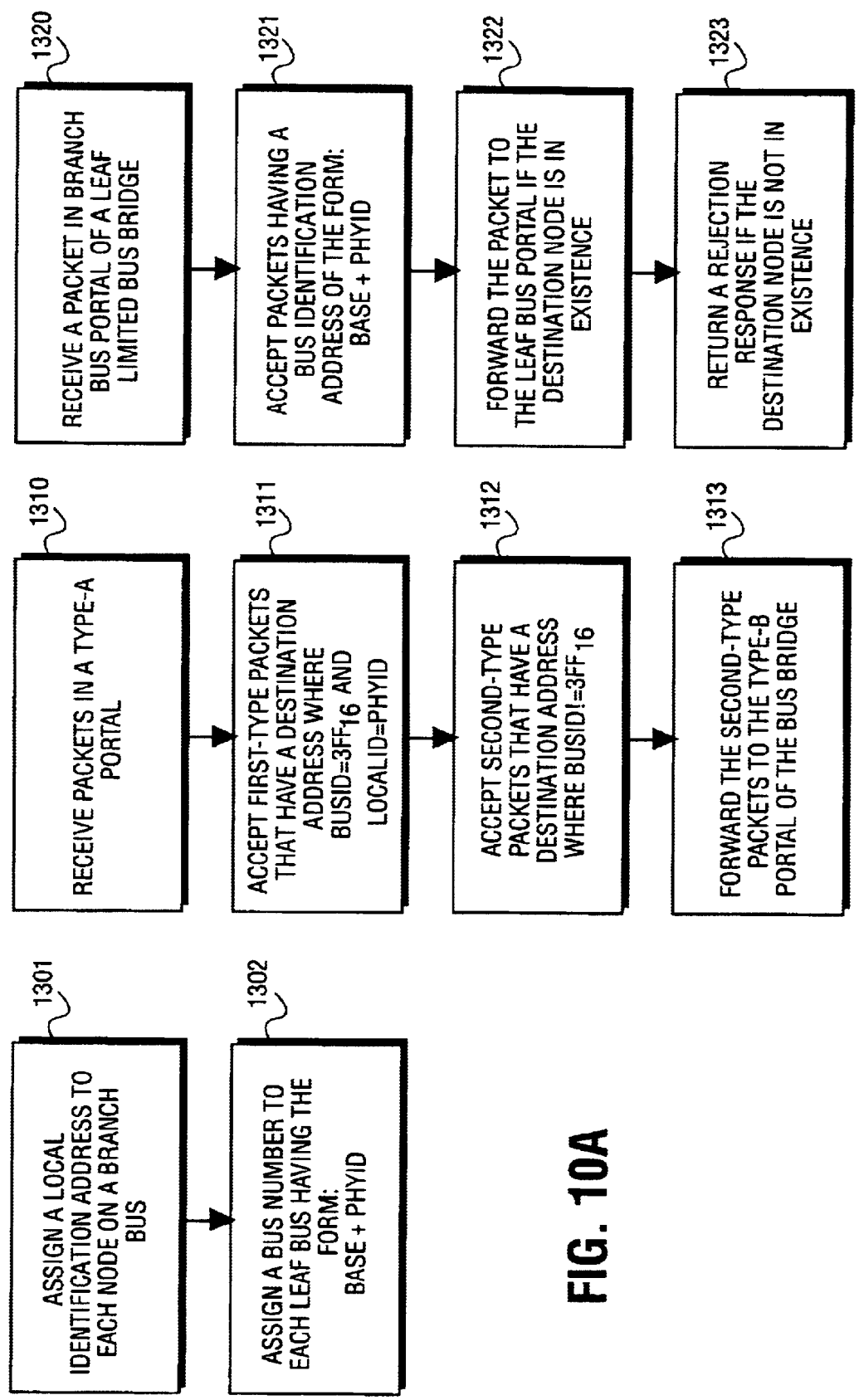
FIG. 10a is a flow diagram of one embodiment of address assignment in a leaf-limited bus bridge.
FIG. 10b is a flow diagram of one embodiment of address routing in a type-A portal of a leaf-limited bus bridge.
FIG. 10c is a flow diagram of one embodiment of address routing in a type-B portal of a leaf-limited bus bridge.

FIG. 10a is a flow diagram of one embodiment of address assignment in a leaf-limited bridge. The prime portal assigns a local identification address to each node on the branch bus at processing block 1301. At processing block 1302, the prime portal assigns a bus number to each leaf bus in the form: Base+phyID (which is phyID in the case shown).

FIG. 10b is a flow diagram of an embodiment of address routing in a type-A portal of a leaf-limited bus bridge. At processing block 1310, type-A portal receives packets. At processing block 1311, type-A portals may accept packets if the destination_ID.busID equals $3FF_{16}$ and destination_ID.localID equals phyID. At processing block 1312, type-A portal may accept packets if destination_ID.busID does not equal $3FF_{16}$. Type-A portal will then forward the accepted packets having destinaion_ID.busID not equal to $3FF_{16}$ at processing block 1313.

FIG. 10c is a flow diagram of an embodiment of address routing in a type-B portal of a leaf-limited bus bridge. A type-B portal receives a packet at processing block 1320. A type-B portal may accept packets if destination_ID.busID equals $3FF_{16}$ and destination_ID.localID equals phyID or if destination_ID.busID equals $000_{16}$ and destination_ID.localID equals phyID. At processing block 1321, a type-B portal may also accept packets if destination_ID.busID equals phyID (or 0+phyID). The type-B portal then forwards the packets to the leaf bus portal, at processing block 1322, if the destination node is in existence. The type-B portal, if it is the prime portal, returns a rejection response, at processing block 1323, according to one embodiment if the destination node is not in existence (as will be described below). These decoding rules are based on the assumption that transactions are predecoded by the producer, which replaces virtual local-bus addresses with their physical address equivalents.

Figure 11:
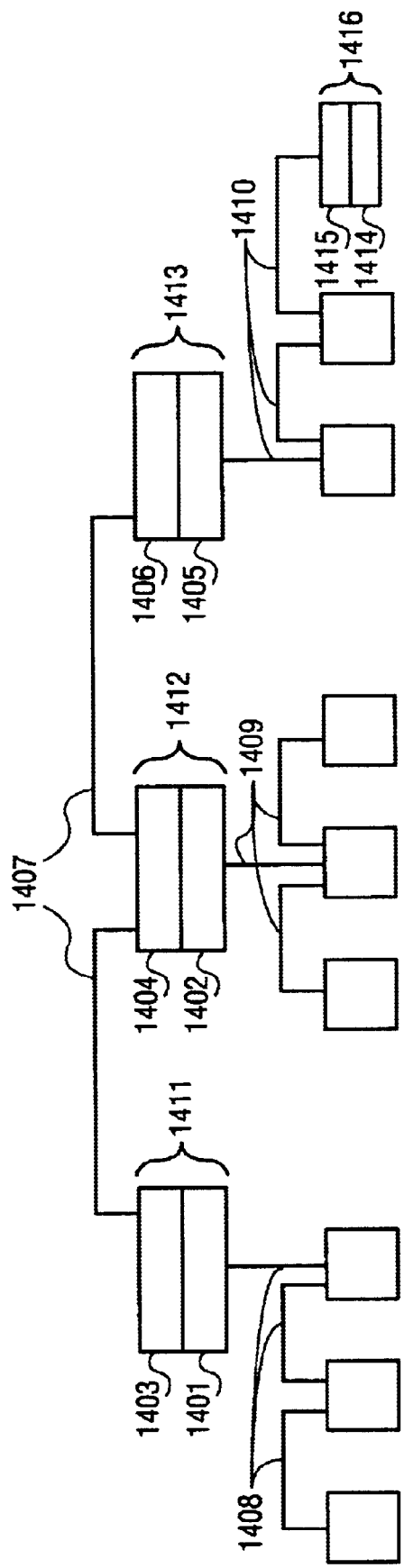
FIG. 11 is a block diagram of one embodiment of a bus system having a heterogeneous topology.

Generalized (non leaf-limited) bridges are architecturally symmetric as they include two type-C portals. FIG. 11 is a block diagram of one embodiment of a bus system having a heterogeneous topology. A heterogeneous leaf-bus topology, as shown in FIG. 11, may have two branch buses 1407, 1410 and two leaf buses 1408, 1409. Branch bus 1407 includes leaf-limited bridges 1411, 1412, having type-A portals 1401, 1402 and type-B portals 1403, 1404, and non leaf-limited bridge 1413, having type-C portals 1405, 1406. In heterogeneous topologies, routing decisions may be simplified as described below.

Type-A portal 1401 may accept packets, as in homogeneous topologies, if the destination_ID.busID equals $3FF_{16}$ and destination_ID.localID equals phyID, or may accept and forward packets if destination_ID.busID does not $3FF_{16}$. Type-B portal 1403 may accept packets if destination_ID.busID equals $3FF_{16}$ and destination_ID.localID equals phyID or if destination_ID.busID equals branchID and destination_ID.localID equals phyID. Type-B portal may accept and forward packets if destination_ID.busID equals leafBusID.

During net refresh operations, type-B portals observe whether other type-C portals are also attached. In one embodiment, when no type-C portals are found, the lowest-phyID type-B portal becomes the prime portal with a limited set of responsibilities, such as to accept nonexistent busID addresses which are accessed and return a rejection response. Nonexistent addresses include a) node addresses that don't exist on this bus (destination_ID.busID equals branchID and valid[destination_ID.localID] equals 0), b) node addresses that don't exist at a local bus address (destination_ID.busID equals $3FF_{16}$ and valid[destination_ID.localID] equals 0), c) busID addresses corresponding to a node that does not exist on a local bus (destination_ID.busID is less than 64 and valid[destination_ID.busID]==0), and d) busID addresses that by convention are never used (destination_ID.busID is greater than or equal to 64).

In one embodiment, when a branch-bus type-C portal is discovered, the type-B portals may abstain from the prime portal selection process. This allows the use of the more sophisticated type-C bus-identifier assignment protocols.

FIG. 12 is a block diagram of one embodiment of a bus system having two bus bridge portals on a leaf bus. Although one bus bridge portal is ever intended to be on a leaf bus, a user could intentionally install more than one, and it is desirable to operate in a defined fashion even when a system is misconfigured.

Figure 13:
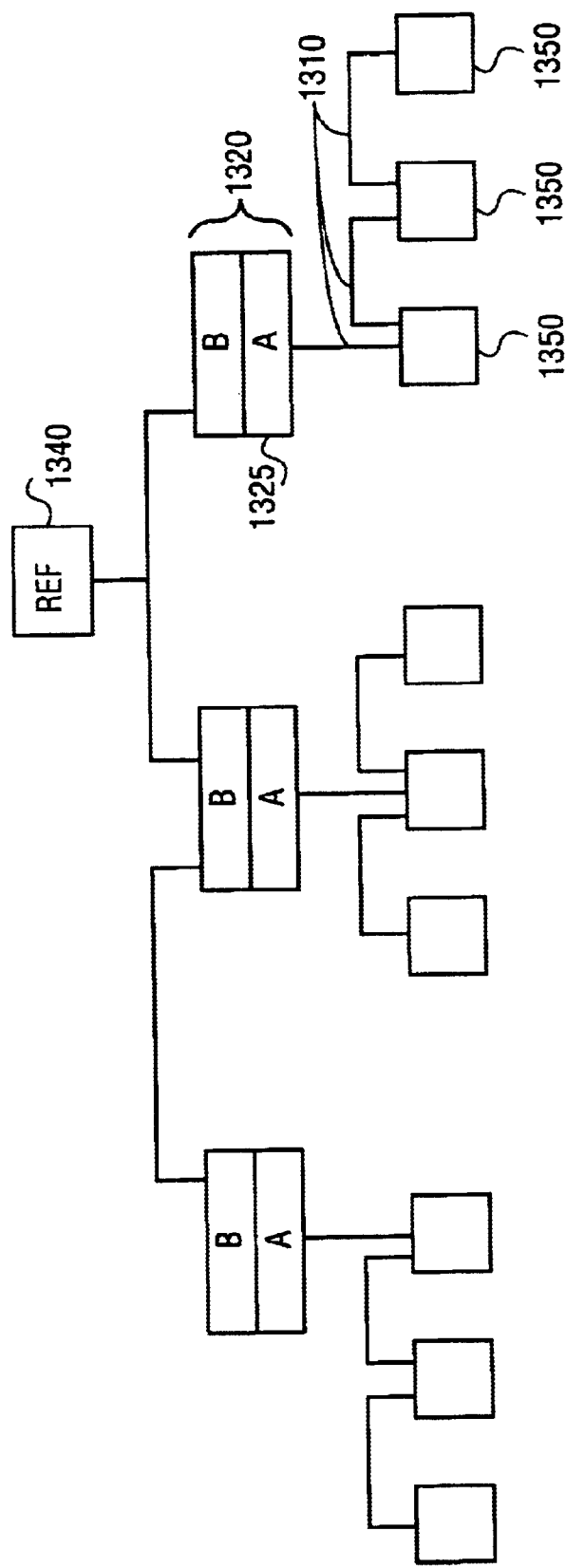
FIG. 13 is a block diagram of another embodiment of a bus system.

FIG. 13 shows a 1394 bus having local busses 1310 and leaf bridges 1320. Each leaf bridge 1320 can synchronize the cycle master 1330, or local clock, to a corresponding reference clock 1340 connected to a local bus 1310 by observing a difference between the reference clock and the cycle master, and using the difference to adjust the cycle master so that the local bus clock is synchronized with the reference clock. However, this synchronization process can be simplified by making bus bridge 1340 the cycle master. The bus bridge port 1325 on the leaf bridge 1320 can become the cycle master for that local bus 1310. This eliminates the need to provide synchronization signals across the bus from the leaf bridge to a separate cycle master node. Thus, the local clock is synchronized with the global clock 1340 by putting the cycle master on the bus bridge 1325.

In order for the bus bridge 1325 to operate as the cycle master, the nodes 1350 of the local bus 1310 are able to identify protocols sent by the bus bridge 1325 that enable the bus bridge to be the cycle master. To become the cycle master, the bus bridge broadcasts a packet to all of the nodes in the local bus identifying the bus bridge as the cycle master. The packet may be broadcast during initialization, or bus reset.

In this embodiment, the bus bridge broadcasts a packet assigning the root node to the bus bridge itself. This clears the root hold-off bit in the other nodes. Then, a bus reset is forced. After the bus reset, the node with the bus hold-off bit is the last node to complete initialization. The last node to complete initialization is the root node. The root node is, among other things, the cycle master.

When the bus bridge is identified as the cycle master, the cycle synchronization is simpler, because there is no need for signals, such as "speed up" or "slow down" to be sent from the local bus to the cycle master. The speedup and slow down signals are sent internally in the bus bridge.

The specific arrangements and methods herein are merely illustrative of the principles of this invention. Numerous modifications in form and detail may be made by those skilled in the art without departing from the true spirit and scope of the invention.

What is claimed is:

1. A method of address management in a net comprising a plurality of buses linked by a plurality of bus bridges, the net having only one branch bus with multiple bus bridges, the method comprising:

assigning a local identification address to each node on a branch bus;

assigning a bus number to each bus other than the branch bus wherein the bus number includes a common base and the local identification address for the node having a portal that connects to that bus; and assigning each bus bridge as a root node for a corresponding leaf bus, so that each bus bridge is a cycle master for the corresponding leaf bus.

2. The method of claim 1 wherein the local identification address is the physical identification address for the node.

3. The method of claim 1 wherein the buses are similar to a version of the IEEE standard 1394 bus.

4. The method of claim 1 further comprising:

receiving a packet including a destination identification address in a branch bus bridge portal; and forwarding the packet if a bus identification portion of the destination identification address matches a function of the local identification address.

5. The method of claim 4 wherein the function of the local identification address equals the local identification address.

6. The method of claim 1 further comprising:

receiving a packet including a destination identification address in a branch bus bridge portal;

accepting the packet; and returning a rejection response if the bus identification address or the local node identification address of the destination node is not in existence.

7. The method of claim 6 wherein the method is performed by the prime portal of the bus system.

8. The method of claim 1 further comprising:

checking for other branch bus portals in a bus bridge including a second branch bus portal; and abstaining from being designated the prime portal if a branch bus portal that is in a bus bridge including a second branch bus portal is found.

9. A net comprising a plurality of buses linked by a plurality of bus bridges, the net having only one branch bus with multiple bus bridges, the bus bridge comprising:

a local address space including local node identification addresses for nodes on the branch bus;

a bus identification address space including bus identification addresses for each leaf bus in the bus system wherein the bus identification addresses are stored as a combination of a predefined base and the local node identification address for the bus bridge connected to the leaf bus; and a root node identification address space including root node identification addresses for each bus bridge, so that each bus bridge is a cycle master for a corresponding leaf bus.

10. The net of claim 9 wherein the buses are similar to a version of the IEEE standard 1394 bus.

11. A memory for storing data for access by an application program being executed on a data processing system, comprising:
- a data structure stored in said memory, said data structure including information resident in a database used by said application program and including:
  - a local node identification address data element for a bus bridge portal;
  - a bus identification address for a bus having only one bus bridge portal, the bus identification address including a function of the local node identification address for the bus bridge portal; and
  - a root node identification address data element for identifying each bus bridge as the root node for a corresponding leaf bus, so that each bus bridge performs as a local clock for the corresponding leaf bus.

* * * * *